No. 894,136.
A. GRANDJEAN.
CARBURETER.
APPLICATION FILED NOV. 28, 1905.
PATENTED JULY 21, 1908.
4 SHEETS—SHEET 4.
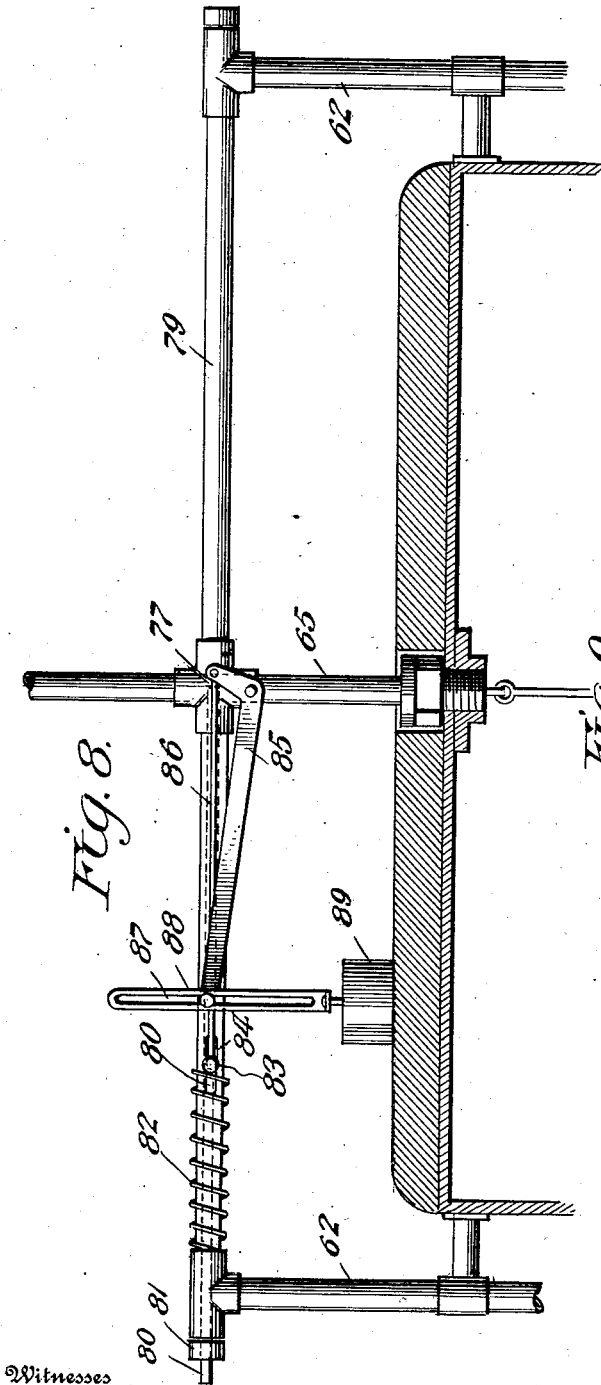
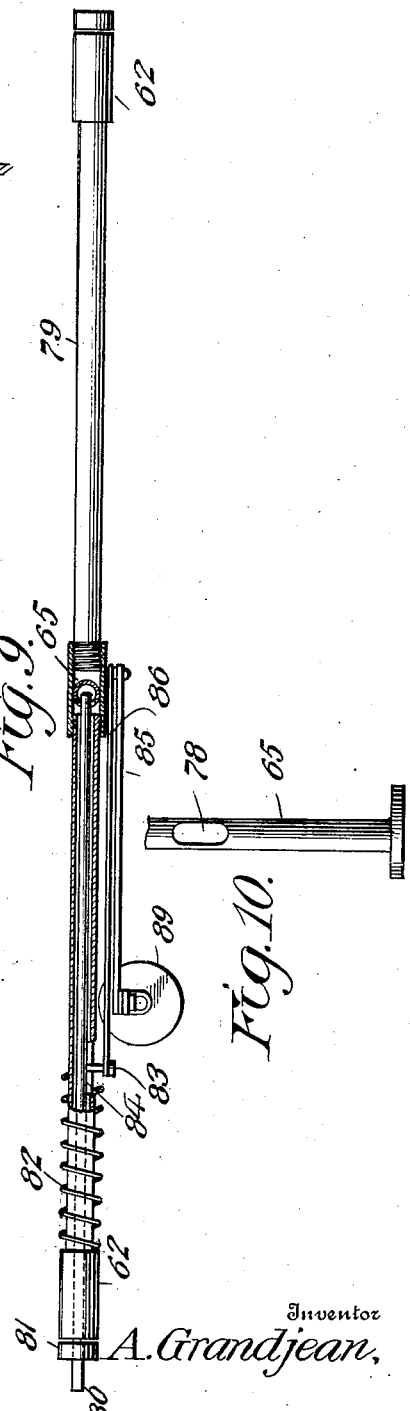
Witnesses
Geo. Ackman Jr.
D. W. Gould.
Inventor
A. Grandjean,
By
Victor J. Evans
Attorney

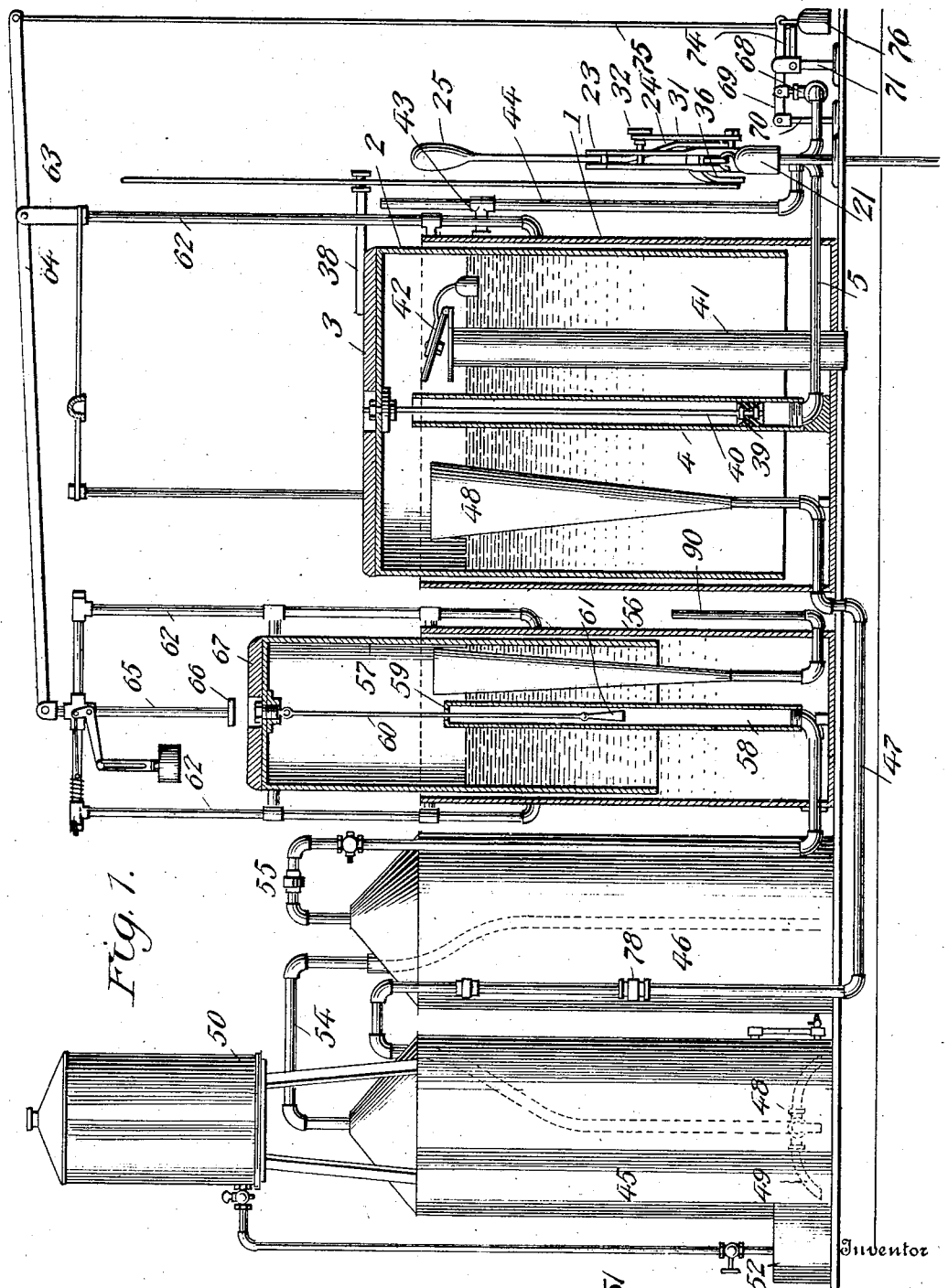

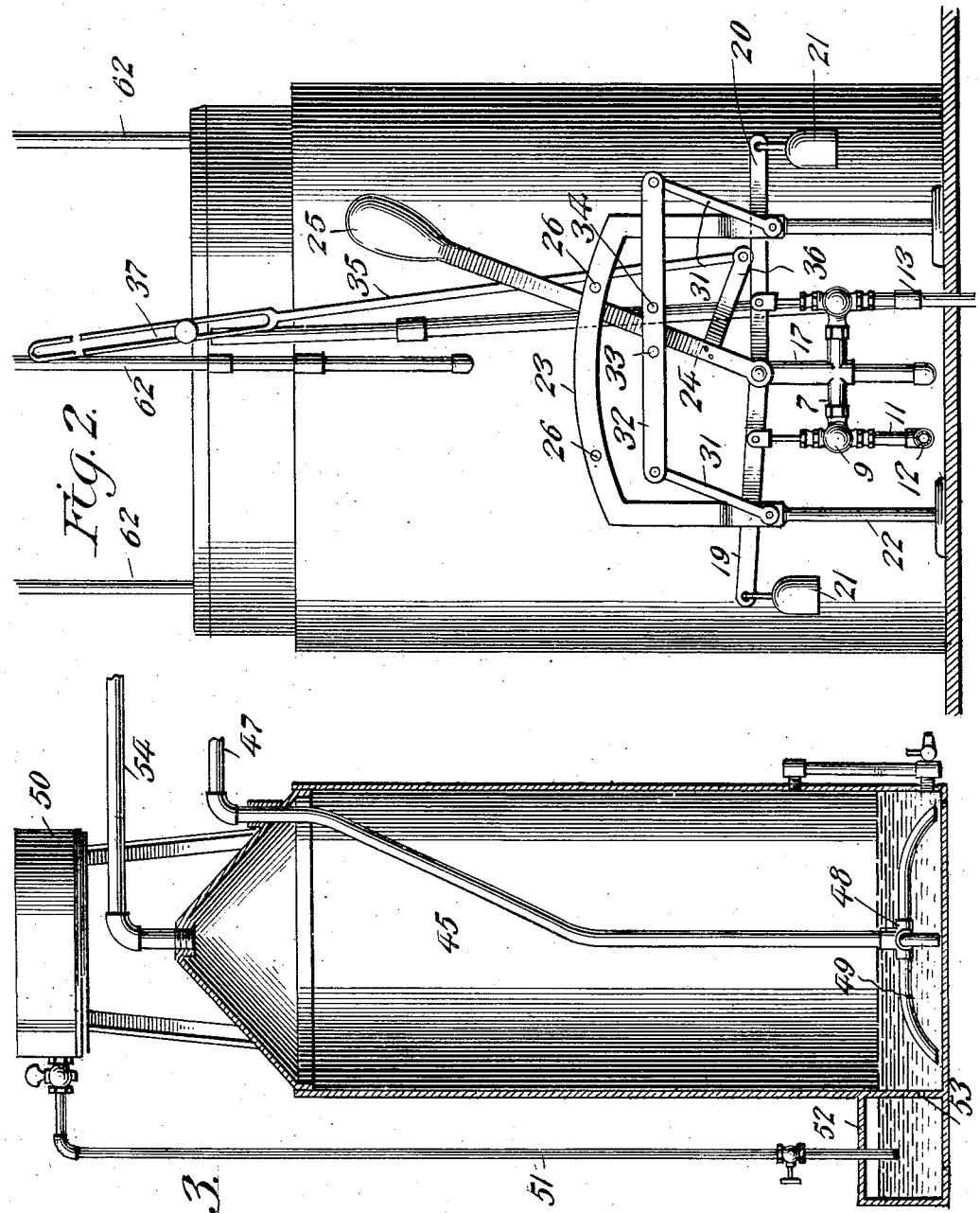

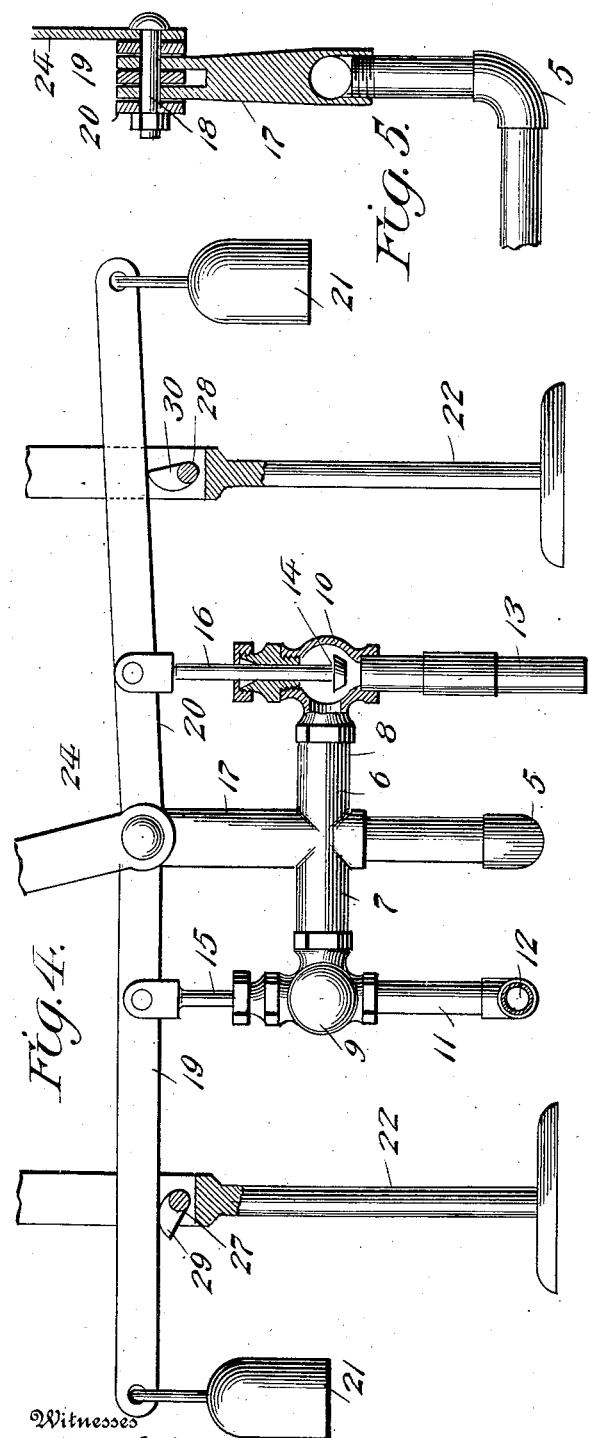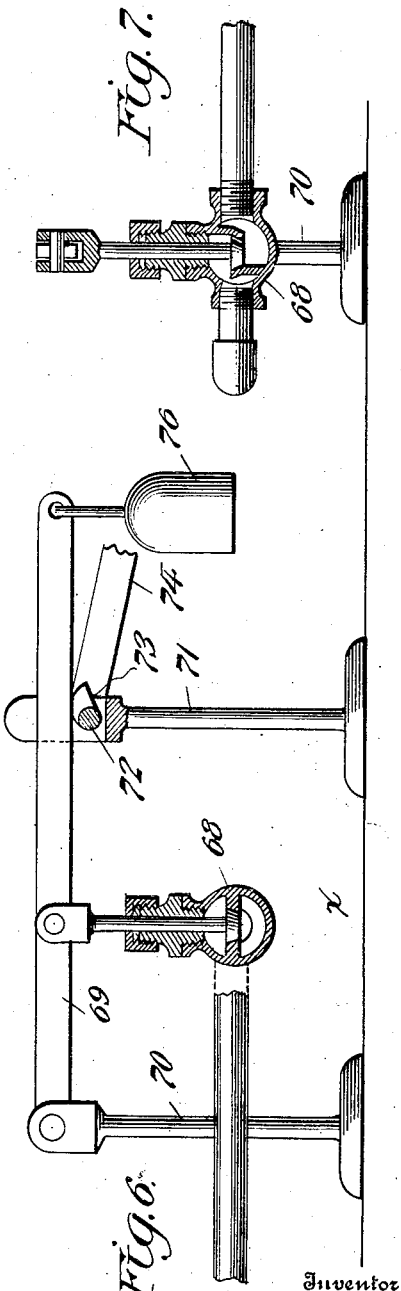

UNITED STATES PATENT OFFICE.

ARTHUR GRANDJEAN, OF SAN DIEGO, CALIFORNIA.

CARBURETER.

No. 894,136.          Specification of Letters Patent.          Patented July 21, 1908.

Application filed November 28, 1905. Serial No. 289,465.

*To all whom it may concern:*

Be it known that I, ARTHUR GRANDJEAN, M. D., a citizen of the United States, residing at San Diego, in the county of San Diego and State of California, have invented new and useful Improvements in Carbureters, of which the following is a specification.

The invention relates to an improvement in carbureters of the type wherein air under pressure is caused to travel through a body of a suitable hydrocarbon, and drawn therefrom in the form of a highly inflammable gas.

The main object of the present invention is the production of means for automatically controlling the air supply to the generator through the medium of any constant pressure supply, as the water service main or the like.

Another object of the invention is the production of means for automatically controlling the means for governing the air supply through the pressure of the gas stored in the gasometer.

With these and other objects in view, the invention consists in certain details of construction and combinations of parts which will be clearly described in the following specification, reference being had to the accompanying drawings, in which:—

Figure 1 is a view in elevation of a carbureting apparatus constructed in accordance with my invention, the air pump and gasometer being shown in vertical sections, Fig. 2 is a side elevation of the same, illustrating particularly means for controlling the air supply, Fig. 3 is a vertical section, partly in elevation of the generator, illustrating particularly the hydrocarbon feed, Fig. 4 is a view in elevation partly in section illustrating the valves, levers, and operating means for the motive fluid, Fig. 5 is a section on line 5—5 of Fig. 4, Fig. 6 is a view in elevation partly in section illustrating the means for controlling the supply of motive fluid from the gasometer, Fig. 7 is a section on line 7—7 of Fig. 6. Fig. 8 is an enlarged elevation partly in section illustrating the means for securing quick operation of the feed valve by the descent of the bell of the gasometer, Fig. 9 is a plan of the same partly sectioned to illustrate the construction, Fig. 10 is a partial elevation of the valve controlling rod operated by the gasometer.

Referring to the drawings, my improved carbureter comprises in its entirety several independent apparatus, each of particular construction and combined to produce a single result, including an air pump for delivering air under pressure to the generator, a hydraulic apparatus, for controlling the supply of air to the pump, a generator and condensing tank to which said air is delivered, a gasometer to which the enriched air or gas is delivered, and means operated by the pressure of gas within the gasometer for controlling the supply of motive fluid to the hydraulic apparatus.

The pump comprises a suitable tank 1 open at the top and arranged to snugly receive an inverted bell tank 2, the latter being mounted for reciprocation relative to the tank 1, and provided on its upper closed end with a weight 3 serving to normally maintain the bell in telescopic relation to the tank, or at its limit of downward movement. Centrally within the tank 1 is arranged a vertical extending pipe 4 in communication at its lower end with a pipe 5 leading exteriorly of the tank 1, and connected at its outer end with a tee coupling 6, the branches 7 and 8 of which communicate with valve casings 9 and 10 respectively located on opposite sides of the pipe 5. The casing 9 communicates with a pipe 11 which in turn is in open communication with any supply pipe carrying water under pressure, as a city service main 12 or the like; while the casing 10 is in open communication with a waste or discharge pipe 13. Each of the casings 9 and 10 are adapted to contain suitable valves as 14, the stems 15 and 16 of which respectively project vertically above the casing. The tee coupling 6 is integrally formed with a vertically projecting post 17 bifurcated at its upper end and revolubly supporting transverse the bifurcation a pivot pin 18. Levers 19 and 20 are pivotally supported at their inner ends on a pin 18, extending in opposite directions from the post 17 and being respectively connected to the valve stems 15 and 16, the free ends of each of the levers being provided with a suitable weight 21. Standards 22 are arranged adjacent the respective levers and support an inverted U-shaped guide frame 23, preferably formed of spaced strips terminally connected to the standards, so arranged as to permit the passage therebetween of the levers 19 and 20. A balance arm 24 is also pivotally secured upon the pin 18, projecting upwardly therefrom and guided between the strips of the frame 23, the upper end of the arm being weighted at 25 and limited in its movement relative to the frame 23 by pins 26 secured transversely of the strips forming the frame. Rods 27—28 are revolubly mounted transversely of the strips forming the frame 23 directly beneath the levers 19 and 20 respectively, on which rod are fixed cams 29 and 30 arranged to contact with and elevate the levers in the proper operation of the rods, the cams being of sufficient length to so elevate the levers as to open the respective valves connected thereto.

The ends of the rods 27—28 beyond the frame 23 are fixedly secured to arms 31, extending upward relative to the structure and connected at their upper ends by a bar 32, which bar is disposed in proximity to the balance arm 24 and is provided with pins 33—34 projecting laterally from said bar and arranged respectively on opposite sides of the balance arm, whereby said arm in movement will impart a reciprocating movement to the bar 32 and thereby rock the rods 27—28 and operate their cams. The cams 29 and 30 are arranged in opposition, so that when one is in operative position the other will be in inoperative position, as clearly seen in Fig. 4. A bar 35 is connected at its lower end to an arm 36 rigidly secured to and projecting at right angles from the balance arm 34, the upper end of the bar being slightly widened and provided with an elongated slot 37. The bar 35 is disposed adjacent to the tank 1, and the slot 37 therein is engaged by a trip 38 secured to the upper end of the bell tank 2, the outer end of said trip being preferably reduced and headed on each side of the reduced portion to engage the slot and prevent disconnection therefrom.

Within the tank 1 the central pipe 4 is provided with a vertically reciprocating piston 39, preferably provided on its upper and lower sides with a pressure packing ring of any desired construction, the rod 40 projecting from the piston being terminally connected to the upper end of the bell tank 2. A stand pipe 41 is fixed within the tank 1, extending at its lower end through said tank and being open to the atmosphere, the upper end of the pipe being closed by any desired form of balance flap valve 42, carrying suitable gaskets or the like to provide an air tight joint when closed. The tank 1 is designed to be initially filled with water to a height below the open end of the pipe 4 and the stand pipe 41, a suitable outlet 43 communicating with the waste pipe 13 through a pipe connection 44 serving to maintain the water level always at this height. The body of water within the tank serves the purpose of the usual seal, and may be renewed when necessary by any suitable means.

The generator comprises tanks 45 and 46, of duplicate construction being essentially enlarged metallic receptacles of the "Wolffian" bottle type. The tank 45 serves as the generator proper, while the tank 46 is more particularly designed as a condensing chamber. The generator proper is in communication with the air pump through the medium of a pipe 47, opening within the bell tank of the pump by a funnel mouth 48 above the water line, and leading from said pump to and within the tank 45, terminating centrally above and in proximity to the bottom of said tank in a cross coupling 28 from the branches of which delivery pipes lead to opposite points in the generator. The generator is fed from a closed air tight supply tank 50, in communication through a valve pipe 51 with a closed feed chamber 52, preferably formed integral with the tank 45 and in communication therewith through a relatively small opening 53 formed in the wall of the generator. The pipe 51 extends a short distance within the feed chamber and serves thereby to regulate the height of the hydrocarbon within the generator, it being understood that the liquid will gravitate from the supply tank 50 as long as the lower end of the pipe 51 is open to the admission of the air, but that the delivery of the liquid within the chamber and generator to a sufficient height to seal the open end of said pipe will arrest the supply.

The generator proper is in communication with the condensing tank through a pipe 54 in communication with said generator at its extreme upper end and leading to and within said condensing tank terminating immediately above the bottom thereof. The condensing tank is in communication with the gasometer through a valve pipe 55, communicating with the condensing tank at its extreme upper end, as shown.

The gasometer comprises the usual tank 56 open at its upper end and the inverted tank or bell 57 mounted for vertical movement therein, the usual water seal being provided. A fixed pipe 58 is arranged centrally of the tank 56 and in open communication at its lower end with the pipe 55 leading from the condensing tank. The upper end of the pipe 58 is formed with a restricted outlet 59, through which passes a rod 60 fixedly connected at its upper end to the center of the bell 57 and provided at its lower end with a conical stopper or valve 61, constructed to close the opening 59 when the bell has reached its limit of upward movement, and thereby prevent further flow of gas into the gasometer.

The bells 2 and 57 of the pump and gasometer respectively are guided on the usual rods 62, and from one of these rods guiding the pump bell is supported a post 63, on the upper end of which is pivotally supported a lever 64, the long or handle end of which projects toward the gasometer and is connected to a rod 65 mounted for reciprocation in a suitable bearing supported on the cross bar joining the guide rod 62. The lower end of the rod 65 is provided with a suitable head 66, arranged to be contacted with by the upper end of the gasometer bell 57, the balancing weight 67 carried by said gasometer bell being preferably cut out to provide a receiving recess for the head 66 whereby to guide the rod 65 in its vertical movement and prevent undue lateral strain. The motive service pipe 12 is, adjacent its connection with the pipe 11 provided with a valve 68, the stem of which is connected to a lever 69 fulcrumed upon a standard 70 projecting from the base of the apparatus. Beyond the valve 68 relative to the standard 70 is arranged a second standard 71 bifurcated at the upper end to receive and guide the free end of the lever 69. Transverse the walls of the bifurcation of standard 71 and beneath the lever is arranged a pivot pin 72, on which, between the walls of the bifurcated, is fixed a cam 73 designed to coöperate with and elevate the lever 69. An arm 74 is fixed upon the pin 72 beyond the standard, its free end being connected with the free end of the lever 64 by a connection 75. The parts are so positioned that when the cam 73 is in inoperative position a weight 76 fixed to the free end of the lever 69 operates to close the valve 68, and thereby shut off the motive fluid supply to the apparatus, while on a reverse movement of the cam, the free end of the lever 69 is elevated opening the valve 68 and reëstablishing the communication.

It has been found desirable to secure a quick action of the valve 68, and for this reason means must be provided for securing an opening movement of the lever 64 at greater speed than incident to the slow descent of the gasometer bell. The construction, with this object in view, is illustrated particularly in Figs. 9 and 10, wherein it will be noted that the rod 65, hereinbefore referred to is hollow and at that point registering with the coupling 77 when the gasometer bell is fully elevated, is formed with an opening 78. The cross bar 79 joining the rod guides 62 of the gasometer bell is hollow and adapted to slidably support a rod 80, the outer end of which projects beyond the free end of the rod 79 and is provided with a stop 81, limiting its movement toward the rod 65. The inner end of this rod is adapted to engage the opening 78 in the rod 65 when the parts are in position and prevent descent of this rod, the engagement being automatically maintained through the medium of a coil spring 82 encircling the pipe 79 and bearing against a pin 83 projecting from the rod 80 and through an elongated slot 84 in the pipe 79, as clearly shown in Figs. 8 and 9. An angle lever 85 is pivotally supported on the coupling 77, the other end of said lever being connected by a rod 86 with the pin 83, while the long end of the lever is provided with a headed pin engaging an elongated slot 87 in a bar 88, which projects toward the gasometer bell and carries on its lower end a weight 89.

A gas service pipe 90 is in communication with the bell of the gasometer, having preferably a conical mouth opening above the liquid seal within the gasometer, and extending beyond the tank thereof to any suitable point of use.

The various pipes described are preferably valved to provide for ready control of the flow of gas and enabling the operator to cut out any particular part of the apparatus to avoid accident, it being particularly important that a check valve 78 be arranged in the air supply pipe 46 between the pump and generator, which valve is arranged to open only toward the generator, whereby any back pressure of the air is avoided.

In operation, assuming the parts constructed and arranged as described and the hydraulic controlling mechanism in the position illustrated in Fig. 2, in which it will be noted that the valve 9, hereinafter termed the inlet valve, is open and the valve 10, hereinafter termed the outlet valve, closed, the motive fluid from the main 12 is freely admitted through the pipe 11, 7 and 5 to the pipe 4 within the tank 1 of the pump. The pressure of the water operates to move the valve 39 upward, thereby elevating the bell 2. This movement of the bell tends to create a partial vacuum above the surface of the sealing liquid, which is counteracted by the inrush of air through the stand pipe 41. The upward movement of the bell, and consequently the indrawing of the air is continued until the trip 38 contacts with the upper wall of the slot 37 in the arm 35. A slightly further movement of the bell after this contact operates to move the balance arm 24 to the reverse position from that shown in Fig. 2, which arm in its movement contacts with the pin 33 projecting from the arm 32 and moves said arm with the effect to reverse the normal or operative position of the cams 29 and 30, moving the former to an inoperative position and the latter to an operative position, as shown in Fig. 4. The weight on the free end of the lever 19 will at once operate to close the inlet valve, while at the same time the cam 30 operates to elevate the free end of the lever 20 and thereby open the outlet valve. The flow of the motive fluid to the pipe 4 is thereby arrested, and the upward movement of the bell 2 stopped, the fluid within said tube 4 finding its way into the escape pipe through the pipes 5, 8 and valve 10, leaving the bell free for downward movement so far as the pressure of the motive fluid is concerned. The weight 3 now operates to depress the bell and thereby force the contained air into the generator, beneath the body of gasolene therein, causing the same to become saturated and enriched to form the desired gas. When the bell 2 has moved downward a sufficient distance to cause the trip 38 to contact with the lower wall of the slot 37, a reverse movement of the parts is effected, closing the outlet valve and opening the inlet valve, and thereby recharging the bell with air, the check valve 78 preventing the return flow of any air delivered through the pipe 47 and beyond said valve. The air or gas from the generator is delivered to the condenser through the pipe 54, in which condenser the superabundant moisture, if any, is removed by gravity, and the gas finds its way therefrom through pipe 55 to the tube 58 of the gasometer, flowing through the restricted opening 59 into and elevating the bell 57 of the gasometer. The movement of the bell continues until it contacts with and elevates the arm 65, rocking lever 64 and through the arm 74 moving the cam 73 to inoperative position, thereby closing the valve 68 in the motive fluid main and shutting off all flow of said motive fluid to the pump without regard to the position of the valves 9 and 10. In the ascent of the gasometer the bar 88 is elevated, and the spring 82 acts to project the rod 81 toward the rod 65 until when the gasometer has reached its upward limit of movement the inner end of the rod 80 will enter the opening 78 in the rod 65 and thereby rock said rod in elevated position. By this construction the gasometer when charged to the desired limit will automatically and at once arrest any movement of the pump, as the flow of the motive fluid is stopped and thereby the bell of the pump is held in its then position until the gas from the gasometer is utilized through the gas service pipe 37, permitting a downward movement of the bell. In the downward movement of the bell of the gasometer the weights 89 and 88 are gradually lowered until the upper wall of the slot 87 contacts with the pin on the end of lever 85, thus moving the lever downward and, through the rod 86 withdrawing the end of the rod 80 from the opening 78 in the rod 65. At this point in the operation the gasometer bell has moved several notches from the headed end of the rod 65, so that when the rod 80 is disengaged therefrom said rod 65 is permitted to drop quickly and suddenly into contact with the gasometer bell, which movement of the rod 65 causes a quick action of the valve 68, thereby admitting an initial flow of sufficient power to properly control a subsequent operation of the apparatus.

The construction described provides for the automatic control of the air supply by means of a motive fluid under pressure, and the effectual control of the motive fluid by the pressure of the generated gas within the gasometer.

A comparatively small quantity of hydrocarbon, preferably gasolene is necessary within the generator, as the quantity and level is automatically maintained by the feeding apparatus described, thereby insuring a uniformly-riched product.

The apparatus as a whole may be supported upon a suitable platform or other base and the various tanks and pipes may be of the desired size in accordance with the quantity of gas needed. While it is preferred that the various tanks of the apparatus be located in proximity to each other, as shown, it is readily apparent that so far as the effective operation of the device is concerned the tanks may be located without particular regard to each other and spaced apart to any extent desired.

As the apparatus as a whole is entirely automatic and self governing it is readily adapted for private or isolated plants, it requiring no manual control beyond the initial adjustment and the necessary renewal of the hydrocarbon within the supply tank.

Having thus described the invention what is claimed as new, is:—

1. The combination with a gas-ometer, of an air pump for delivering air thereto, a motive fluid under pressure for operating said pump, pump operated means for controlling said motive fluid, and independent means operated by the pressure in the gas-ometer for controlling the motive fluid supply, and gas-ometer controlled locking means for said independent means.

2. The combination with a gas-ometer, of an air pump for delivering air thereto, a motive fluid under pressure for operating the pump, means for controlling the motive fluid supply to the pump, independent means for controlling the motive fluid supply, gravity operated means for moving the independent means in one direction, gravity operated means for moving the independent means in the opposite direction, and means whereby the gas-ometer may release one of said gravity operated means to influence the independent means.

3. The combination with a gas-ometer, of an air pump in communication therewith, a motive fluid supply pipe in communication with the pump, and means operated by the movement of the gas-ometer bell to control the motive fluid supply to the pump, and gas-ometer controlled means for normally locking said operating means against action.

4. The combination with a gas-ometer, of an air pump in communication therewith, a motive fluid supply pipe in communication with the pump, means operated by the movement of the gas-ometer bell to control the motive fluid supply to the pump, and independent means operated in the movement of the pump for directly controlling the motive fluid supply thereto, and means for normally locking said independent means against operation in one direction.

5. The combination with a gas-ometer, of an air pump for delivering air thereto, a motive fluid under pressure for operating the pump, means for controlling the motive fluid supply to the pump, independent means for controlling the motive fluid supply, gravity operated means for moving the independent means in one direction, gravity operated means for moving the independent means in the opposite direction, and means whereby movement of the gas-ometer in one direction permits operation of the independent means by the first mentioned gravity means, the movement of the gas-ometer in the opposite direction releasing the second gravity operated means to influence the independent means.

6. A gas-ometer, an air pump in communication therewith, a motive fluid supply, means operated by the pump for controlling said supply, a valve for admitting the motive fluid to the pump controlled means, and means operated by the movement of the gas-ometer bell to control said valve, and means to prevent operation of the valve operating means until the gas-ometer bell reaches a predetermined point in its descent.

7. A gas-ometer, an air pump in communication therewith, a motive fluid supply, means operated by the pump for controlling said supply, a valve for admitting the motive fluid to the pump controlled means, means operated by the movement of the gas-ometer bell to control said valve, and means for automatically locking the valve controlling means against operation until the gas-ometer bell has reached a predetermined point in its movement.

8. A gas-ometer, an air pump in communication therewith, a motive fluid supply, means operated by the pump for controlling said supply, a valve for admitting motive fluid to the pump controlled means, and means operated by the movement of the gas-ometer bell to control said valve, said means being locked against operation when the bell has reached the upward limit of movement.

9. A gas-ometer, an air pump in communication therewith, a motive fluid supply, means operated by the pump for controlling said supply, a valve for admitting the motive fluid to the pump controlled means, means operated by the movement of the gas-ometer bell to control said valve, means for automatically locking said valve controlling means, and means for automatically releasing the lock when the gas-ometer bell has reached a predetermined point in its descent, whereby to insure a sudden gravitation of the valve controlling means.

10. The combination with a gas-ometer, of an air pump for delivering air thereto, a motive fluid under pressure for operating said pump, means for controlling the motive fluid supply, independent means influenced by the gas-ometer for controlling the motive fluid supply, a weighted lever directly connected with said independent means and serving to operate the same in one direction, and means operated by the gas-ometer for controlling movement of said lever in both directions, said latter means being influenced by the movement of the gas-ometer until the latter has reached a determinate point in such movement.

In testimony whereof, I affix my signature in presence of two witnesses.

ARTHUR GRANDJEAN.

Witnesses:
A. P. JOHNSON, Jr.,
V. I. McINTYRE.